United States Patent [19]

Toshio et al.

[11] Patent Number: 4,763,475
[45] Date of Patent: Aug. 16, 1988

[54] CONTROL APPARATUS FOR A WASTE GATE VALVE OF A TURBOCHARGER IN AN INTERNAL COMBUSTION ENGINE

[75] Inventors: Ishii Toshio, Mito; Yasunori Mouri, Katsuta, both of Japan

[73] Assignee: Hitachi, Ltd., Tokyo, Japan

[21] Appl. No.: 94,605

[22] Filed: Sep. 9, 1987

[30] Foreign Application Priority Data

Sep. 10, 1986 [JP] Japan .............................. 61-211638

[51] Int. Cl.$^4$ ............................................ F02B 37/12
[52] U.S. Cl. .................................................... 60/602
[58] Field of Search ................... 60/600, 601, 602, 603

[56] References Cited
U.S. PATENT DOCUMENTS 4,477,875 10/1984 Suzuki et al. ................... 60/602 X
4,691,521 9/1987 Hirabayashi et al. ................. 60/602
4,697,421 10/1987 Otobe et al. ........................... 60/602

Primary Examiner—Michael Koczo
Attorney, Agent, or Firm—Antonelli, Terry & Wands

[57] ABSTRACT

In a supercharger for an internal combustion engine having a waste gate valve, a signal for controlling the opening of the waste gate valve is generated in such a manner that a basic amount thereof is produced on the basis of the opening of a throttle valve and the number of revolutions of the engine and then the basic amount is so corrected that an actual mass flow rate of intake air follows a desired value thereof determined by the opening of the throttle valve and the number of revolutions of the engine at that time. According to this, a temperature sensor exclusively used for the controlling the waste gate can be omitted.

6 Claims, 3 Drawing Sheets

CONTROL APPARATUS FOR A WASTE GATE VALVE OF A TURBOCHARGER IN AN INTERNAL COMBUSTION ENGINE

BACKGROUND OF THE INVENTION

1. Field of The Invention

The present invention relates to a control apparatus for a waste gate valve of a supercharger in an internal combustion engine, more particularly to an apparatus capable of controlling the waste gate valve accurately without providing any special sensor for detecting the temperature of intake air into the internal combustion engine.

2. Description of The Related Art

As is well known, a supercharger for an internal combustion engine has a turbine, which is provided within an exhaust pipe and operated by exhaust gas from the engine, and a compressor, which is provided within an intake pipe and operably coupled with the turbine. The engine is supercharged with air by the compressor driven by the turbine so that the charging efficiency of intake air in the engine is much improved.

In such a supercharger, there is usually provided a waste gate valve in a path which makes a part of the exhaust gas by-pass the turbine of the supercharger. The excessive increase of the supercharging pressure during the high speed operation of the engine is suppressed by controlling the opening of the waste gate valve in accordance with the pressure within the intake pipe.

The control of such a waste gate valve is carried out by an electronic control device including a microprocessor. A typical one of examples of such an electronic control device is disclosed in Japanese Patent Laid-open Publication No. 60-81425 (published May 9, 1985). In this prior art, attention is paid to the fact that, although the charging efficiency depends on the intake pressure, which is pressure within an intake pipe in the down stream of a throttle valve, the intake pressure is greatly influenced by the supercharging pressure in the range of the large opening of the throttle valve.

Then, according to the prior art, an actual value of the intake pressure is controlled following a desired value thereof, which is determined in accordance with the number N of revolutions of the engine and the temperature $T_a$ of the intake air. To this end, an apparatus according to the prior art has a memory map from which the desired value of the intake pressure is read out in response to N and $T_a$ detected by respective sensors.

As described above, in the prior art, there was necessary a sensor exclusively used for detecting the temperature $T_a$ of the intake air, with the result that the number of sensors is increased. Usually, in an electronic control apparatus of this kind, a great concern must be paid about the utilization efficiency of equipment included in the apparatus. The increase in the number of sensors deteriorates this utilization efficiency.

SUMMARY OF THE INVENTION

It is an object of the present invention to provide a control apparatus for a waste gate valve of a supercharger in an internal combustion engine, which does not necessitate any sensor used only for the purpose of detecting the temperature of intake air.

A feature of the present invention is in that a signal for controlling a waste gate valve is produced such that a basic amount of the control signal is at first generated on the basis of the opening of a throttle valve and the number of revolutions of an engine and then the basic amount is corrected in accordance with the relation between an actual value of a signal depending on a mass flow rate of intake air and a desired value thereof which is also determined by the opening of the throttle valve and the number of revolutions of the engine.

The signal depending on the mass flow rate of the intake air can be the mass flow rate itself directly detected by a mass flow sensor. Instead, a load rate defined as a ratio of the mass flow rate to the number of revolutions can be also utilized.

According to the present invention, a final signal for controlling the waste gate valve is determined by using the mass flow rate of intake air, which is inherently compensated against the temperature of the intake air. Therefore, any special sensor for detecting the temperature of the intake air is not required. Further, the present invention is most advantageous particularly in an electronic control apparatus for an internal combustion engine, in which the fuel injection control is carried out on the basis of the mass flow rate of the intake air, since such a control apparatus is already equipped with an air flowmeter of the type capable of measuring the mass flow rate of the intake air.

DESCRIPTION OF THE PREFERRED EMBODIMENT

Referring to the accompanying drawings, the description will be made of an embodiment of the present invention in the following.

Figure 1:
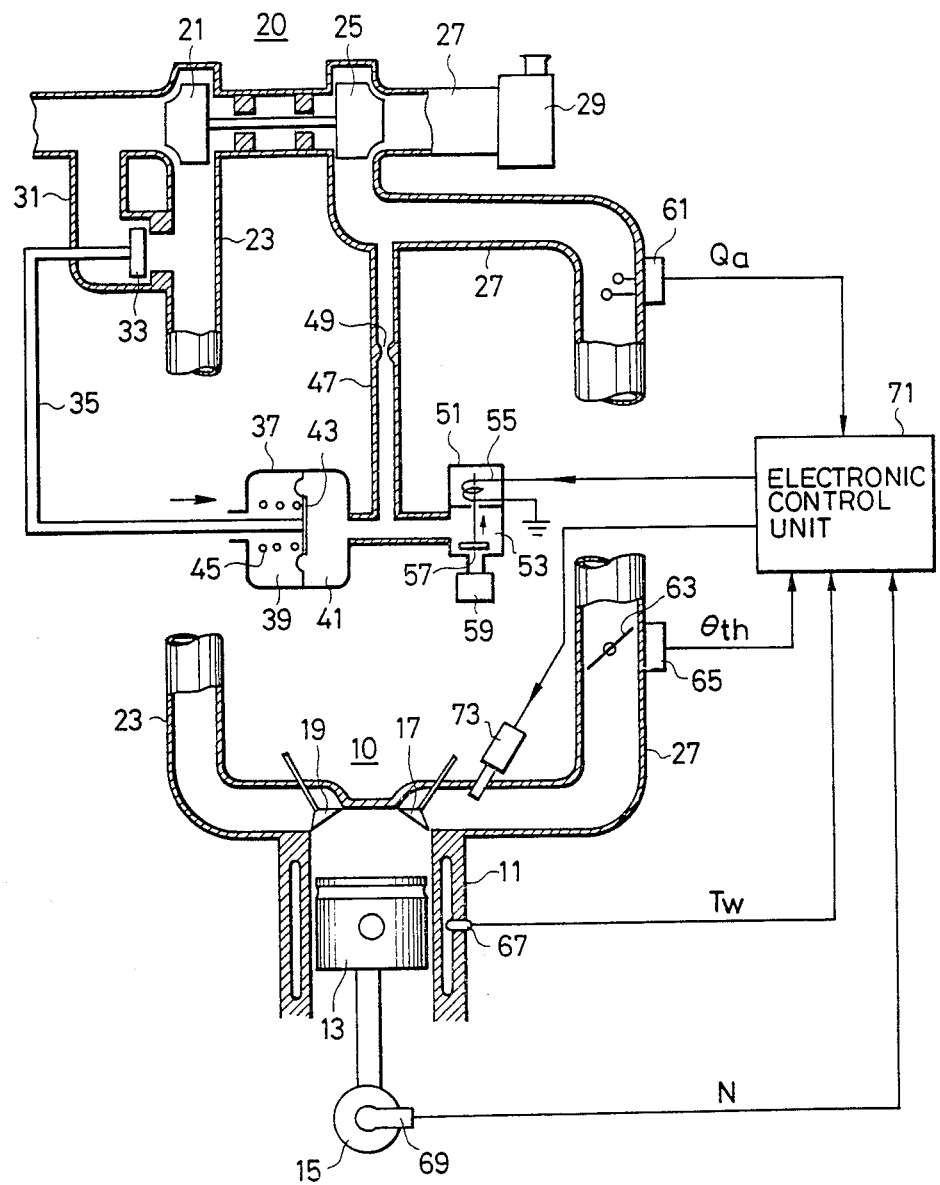
FIG. 1 schematically shows the configuration of a control apparatus for a waste gate valve according to an embodiment of the present invention.

In FIG. 1 of the drawings, there is shown the configuration of a control apparatus for a waste gate valve according to this embodiment. In the figure, an internal combustion engine 10 is schematically shown with only one cylinder 11. Within the cylinder 11, a piston 13 continues the reciprocating movement to rotate a crank shaft 15. A combustion chamber defined by the inner wall of the cylinder 11 and the piston 13 is communicated with an intake pipe 27 and an exhaust pipe 23 through an inlet valve 17 and an outlet valve 19, respectively.

The engine 10 is equipped with a supercharger 20, which is composed of a turbine 21 and a compressor 25 operably coupled with the turbine 21. The turbine 21 is provided in a part of the exhaust pipe 23 and operated by exhaust gas from the engine 10. The exhaust pipe 23 is provided with a path 31 which by-passes the turbine 21. In the path 31 is provided a waste gate valve 33, the opening of which is controlled by an actuator described later through an appropriate link mechanism 35. By changing the opening of the valve 33, the amount of the exhaust gas by-passing the turbine 21 is adjusted so that the number of revolutions of the turbine 21 is varied.

The compressor 25 of the supercharger 20 is installed within a part of the intake pipe 27 downstream of an air cleaner 29. The compressor 26 is driven by the turbine 21 to supercharge the engine 10 with intake air. The pressure of the supercharging varies as the change in the number of revolutions of the compressor 25. Therefore, the supercharging pressure can be controlled by changing the number of revolutions of the turbine 21.

There is further provided a diaphragm actuator 37 for actuating the waste gate valve 33. The actuator 37 has two chambers 39, 41 separated by a diaphragm 43. Within the chamber 39 there is provided a spring 45, by which the diaphragm 43 is biased in the direction of closing the waste gate valve 33. Further, the inside of the chamber 39 is maintained at the atmospheric pressure. The chamber 41 is communicated through a path 47 having an orifice 49, with the intake pipe 27 downstream from the compressor 25, so that a part of the supercharging pressure is imposed on the diaphragm 43 and puts it in the direction of opening the waste gate valve 33. In this manner, the opening of the waste gate valve 33 is controlled by the operation of the spring 45 and the pressure within the chamber 41.

The path 47 is also connected to a chamber 53 of a control valve 51, which is actuated by a solenoid coil 55 provided therein. When the coil 55 is energized, a valve 57 is moved in the direction shown by an arrow so that the chamber 53 is communicated with the atmosphere through an air filter 59. When the chamber 53 of the control valve 51 is opened to the atmosphere, the pressure within the chamber 41 of the actuator 37 is released to the atmosphere. To the contrary, the pressure within the chamber 41 is raised by the supercharging pressure, when the valve 57 of the control valve 51 is closed by deenergization of the solenoid coil 55.

The coil 55 is energized intermittently so that the chamber 53 of the control valve 51 is repeatedly opened or closed to the atmosphere. If, therefore, the ratio of the opening duration to one cycle of the repetitive operation is varied, the pressure within the chamber 41 can be controlled in proportion to that ratio, and the displacement of the diaphragm 43, i.e., the opening of the waste gate valve 33, is controlled accordingly. Further, the ratio mentioned above will be called a duty factor of the control valve 51, hereinafter. In this manner, the opening of the waste gate valve 33, and therefore the number of revolutions of the turbine 21 can be adjusted by controlling the duty factor of the control valve 51.

There are further provided various sensors for detecting parameters indicative of the operating condition of the engine 10. The intake pipe 27 is provided with an airflow sensor 61 downstream from the compressor 25, which detects the mass flow rate of the intake air and produces a signal $Q_a$ in proportion to a detected value thereof. It is to be noted that, in the present invention, the airflow sensor 61 is necessary to be a sensor of the type capable of measuring the mass flow rate. In this embodiment, a hot-wire type airflow sensor is used. As is well known, the airflow sensor of this type has a hot wire and a cold wire and can obtain the temperature-compensated airflow rate.

To a throttle valve 63 provided in the intake pipe 27 downstream from the airflow sensor 61 is attached a throttle opening sensor 65 which measures the degree of opening of the throttle valve 63 and produces a signal $\theta_{th}$ proportional to the measured value of the throttle opening. A temperature sensor 67 is provided in a wall of the cylinder 11 to detect the temperature of cooling water within a water jacket. The sensor 67 produces a signal $T_w$ in proportion to the temperature of the cooling water. Further a rotation sensor 69 is attached to the crank shaft 15, which produces a signal N in proportion to the number of revolutions of the engine 10.

All the signals $Q_a$, $\theta_{th}$, $T_w$ and N produced by the respective sensors are led to an electronic control unit 71 including a well known microprocessor, which is programed so as to execute the various processing for the control of the engine 10. The unit 71 carries out, for example, the predetermined processing for the fuel injection control on the basis of the received signals $Q_a$, $\theta_{th}$, $T_w$ and N and produces a control signal for a fuel injector 73, which is equipped in the intake pipe 27 in the vicinity of the inlet valve 17. The control signal for the fuel injector 73 is a signal for controlling the amount of fuel to be injected into the cylinder 11 and determines the opening duration of a valve of the injector 73. As is well known, this signal is produced in such a manner that a signal for a basic amount of fuel to be injected is at first produced in proportion to $Q_a/N$ and then the thus obtained signal is compensated in accordance with $\theta_{th}$ and $T_w$.

The electronic control unit 71 according to the present embodiment also produces a control signal which controls the duty factor of the control valve 51. The processing operation carried by the unit 71 for producing this control signal will be explained below, referring to the FIG. 2.

The figure shows a flow chart of the processing operation to be executed by the microprocessor included in the electronic control unit 71 in order to produce the signal for controlling the duty factor of the control valve 51. The processing operation of this flow chart is initiated for every occurrence of a signal representative of a top dead center of the piston 13 or every constant time period. In view of the importance of the control of the waste gate valve, the aforesaid time period is desirable to be less than about 40 milliseconds.

Figure 3:
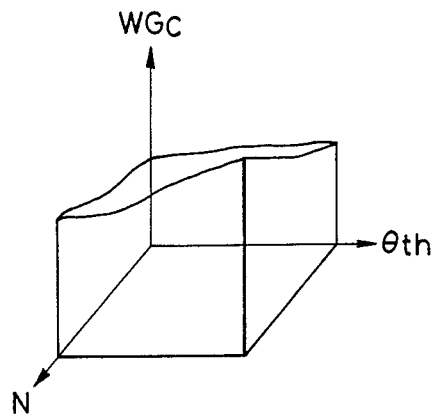
FIG. 3 is a diagram for explaining an example of a three-dimensional memory map, on which a medial value of a control signal (duty factor) applied to a control valve is determined in order to control the opening of the waste gate valve.

After the operation starts, the output signal $Q_a$ of the air flowmeter 61 is read into the microprocessor at step 101. Similarly, at step 103, the output signals $\theta_{th}$ and N of the throttle opening sensor 65 and the rotation sensor 69 are taken thereinto. At step 105, a medial value $WG_C$ of the duty factor of the control valve 51 is obtained on the basis of $\theta_{th}$ and N, i.e., the operational condition of the engine 10 at that time. The medial values $WG_C$ of the duty factor are obtained for the various conditions of the operation in advance by the trial operation of an engine and stored in a memory as a threedimensional map. An example of the three-dimensional map is shown in FIG. 3. Therefore, at step 105, the medial value $WG_C$ of the duty factor is obtained by retrieving the $WG_C$ map on the basis of $\theta_{th}$ and N taken into the microprocessor at step 103.

Figure 4:
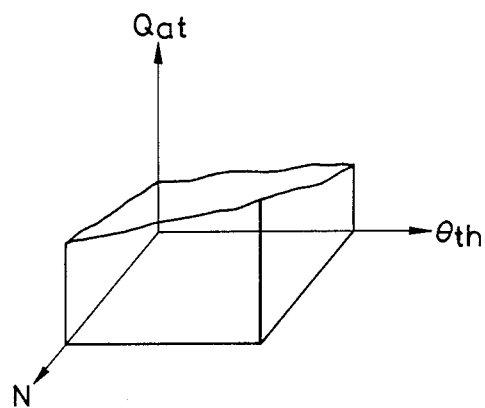
FIG. 4 is a diagram for explaining an example of a three-dimensional memory map, on which a desired value of the mass flow rate of intake air is determined.

Then, the operation goes to step 107, at which a desired value $Q_{at}$ of the mass flow rate of intake air is obtained in correspondence to the operational condition of the engine 10 at that time. Similarly to the case of the medial values $WG_C$ of the duty factor as mentioned above, the desired values $Q_{at}$ of the mass flow rate are obtained for the various conditions of the operation in advance by the trial operation of the engine and stored in the memory as a three-dimensional map. An example of the three-dimensional map is shown in FIG. 4. Therefore, at step 107, the desired value $Q_{at}$ is obtained by retrieving the $Q_{at}$ map on the basis of $\theta_{th}$ and N taken into the microprocessor at step 103.

Thereafter, at step 109, the actual value $Q_a$ taken at step 101 is compared with the desired value $Q_{at}$ retrieved at step 107. Then, at steps 111, 113 and 115, a correction amount $WG_{CO}$ for the medial value $WG_C$ of the duty factor is determined in accordance with the comparison result of step 109, i.e., the relation of the actual value $Q_a$ of the mass flow rate to the desired value $Q_{at}$ thereof.

If $Q_a$ is larger than $Q_{at}$, it means that the engine 10 is in a state of the over-supercharging. At that time, as shown at step 111, a new correction amount $WG_{CO}$ is determined by subtracting a predetermined value $\Delta D$ from an old correction amount $WG_{CO}$ used in the last processing operation. Further, the correction amount $WG_{CO}$ is set at zero for the first time of the processing operation.

To the contrary, when $Q_a$ is smaller than $Q_{at}$, the engine 10 is in a state of the under-supercharging. Then, at step 113, the correction amount $WG_{CO}$ is renewed by adding the predetermined value $\Delta D$ to the old correction amount $QG_{CO}$. If it is judged at step 109 that $Q_a$ is equal to $Q_{at}$, step 115 is selected, at which the new correction amount $WG_{CO}$ is obtained by adding zero to the old one $WG_{CO}$. Namely, in this case, the value of the correction amount $WG_{CO}$ is not changed, and therefore the same state of the supercharging is maintained.

After the new correction amount $WG_{CO}$ is determined as described above, the operation goes to step 117, at which the determined correction amount $WG_{CO}$ is subjected to the limiting processing. Thereafter, at step 119, the correction amount $WG_{CO}$ is added to the medial value $WG_C$ of the duty factor obtained at step 105, whereby a final signal $WG_D$ of the duty factor is determined, according to which the control valve 51 is controlled.

Figure 2:
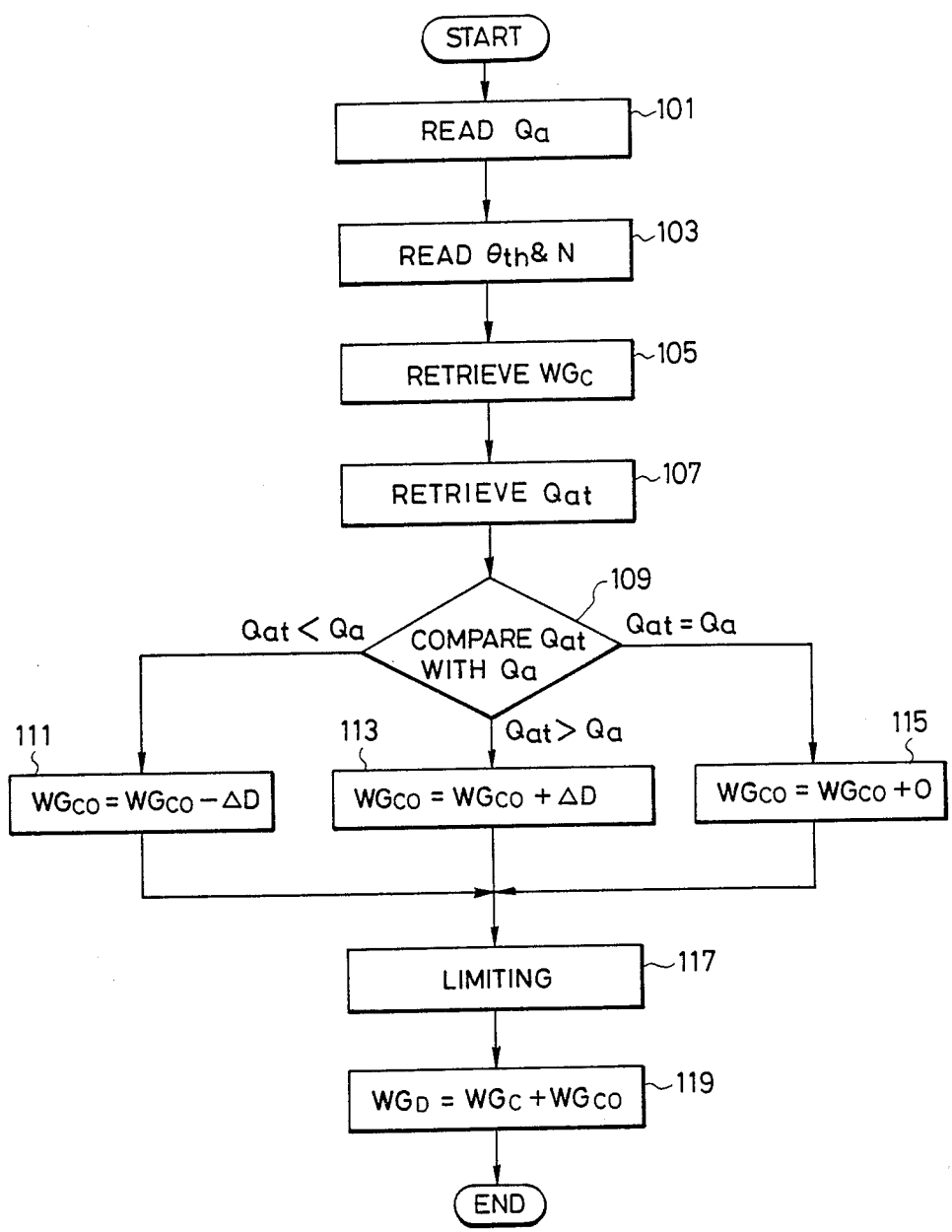
FIG. 2 is a flow chart showing the operation of an electronic control unit included in the control apparatus of FIG. 1.

As the result of the processing operation shown in FIG. 2 and described above, the supercharging pressure is controlled as follows. First of all, when the engine 10 is in the state of the over-supercharging, i.e., when it is judged at step 109 that $Q_a$ is larger than $Q_{at}$, the duty factor $WG_D$ is decreased as shown at step 111 and the supercharging pressure is introduced into the chamber 41 of the actuator 37 as much. Therefore, the diaphragm 43 is moved in the direction of opening the waste gate valve 33 against the force of the spring 45, whereby the amount of the exhaust gas by-passing the turbine 21 increases, with the result that the number of revolutions of the turbine 21 decreases to reduce the excessive pressure of the supercharging.

Next, when the engine 10 is in the state of the under-supercharging, i.e., when it is judged at step 109 that $Q_a$ is smaller than $Q_{at}$, the duty factor $WG_D$ is increased as shown at step 113 and the supercharging pressure introduced into the chamber 41 is released to the atmosphere in accordance with the increased duty factor $WG_D$. The diaphragm 43 is moved by the spring 45 in the direction of closing the waste gate valve 33. Thereby, the amount of the exhaust gas by-passing the turbine 21 decreases, with the result that the number of revolutions of the turbine 21 increases to raise the pressure of the supercharging. In the case where $Q_a$ is equal to $Q_{at}$, the same state of supercharging is maintained, because the duty factor $WG_D$ is not changed as shown at step 115.

Figure 5:
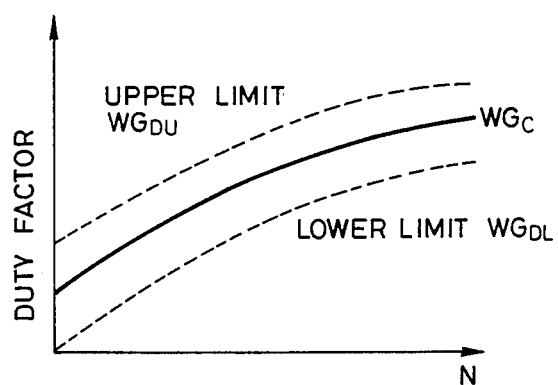
FIG. 5 is a diagram showing an example of characteristic of a limiter used in the embodiment.

Further, by virtue of the limiting processing of step 117, the final signal for the duty factor changes with respect to the number N of revolutions of the engine as shown in FIG. 5. Namely, in the case of the oversupercharging, the final duty factor signal $WG_D$ can takes the value between the medial value $WG_C$ of the duty factor and a lower limit $WG_{DL}$ thereof, whereas, in the case of the under-supercharging, the final duty factor signal $WG_D$ is controlled between the medial value $WG_C$ of the duty factor and an upper limit $WG_{DU}$ thereof. The tolerance for the duty factor as shown in FIG. 5 is provided in order to prevent the overshooting in the control of the supercharging. Further, this tolerance is also useful for absorbing the difference in the characteristics of individual internal combustion engines to which the control apparatus according to the present invention is applied.

Moreover, in the foregoing description, the duty factor of the control valve 51 is so controlled that the actual value $Q_a$ of the mass flow rate of the intake air follows the desired value $Q_{at}$ determined in accordance with the operational condition of the engine at that time. However, instead of the mass flow rate $Q_a$, the value $Q_a/N$, which is called a load data, can be used. At that time, in the flow chart of FIG. 2, there must be provided, e.g., after step 103, an additional step, at which $Q_a$ taken at step 101 is divided by N taken at step 103. In addition, the $Q_{at}$ map as shown in FIG. 4 must be replaced by a $Q_{at}/N$ map. Such a map can be easily prepared from the $Q_{at}$ map. If this embodiment is applied to an electronic engine control apparatus of the type, in which the fuel injection control is carried out on the basis of the mass flow rate of the intake air, it is very advantageous, because the amount $O_{at}/N$ is already handled in this type of control apparatus as one of key parameters for the fuel injection control.

As described above, the present invention does not require any temperature sensor exclusively used for detecting the temperature of the intake air, because the opening of the waste gate valve is controlled on the basis of the output of a mass flow meter of the intake air, which is inherently compensated against the temperature of the intake air.

What is claimed:

1. A control apparatus for a waste gate valve of a supercharger in an internal combustion engine, having
    a waste gate valve provided in a path for making a part of exhaust gas from the engine by-pass a turbine of the supercharger, by which the amount of the exhaust gas supplied for the turbine is changed;
    an actuator for adjusting the opening of said waste gate valve in response to a control signal supplied therefor; and
    an electronic control unit for receiving various signals of parameters indicative of the operational condition of the engine, including at least the opening of a throttle valve and the number of revolutions of the engine, to produce the control signal for said actuator in response to the received signals, characterized in that
    there is further provided an airflow sensor for detecting a mass flow rate of intake air into the engine, and
    said electronic control unit produces the control signal for said actuator by generating a basic amount thereof on the basis of the opening of the throttle valve and the number of revolutions of the engine and then correcting the basic amount in accordance with the relation between an actual value of a signal depending on the mass flow rate of the intake air and a desired value thereof which is determined by the opening of the throttle valve and the number of revolutions of the engine.

2. A control apparatus for a waste gate valve as defined in claim 1, wherein said airflow sensor is a hotwire type airflow sensor.

3. A control apparatus for a waste gate valve as defined in claim 1, wherein the signal depending on the mass flow rate is a mass flow rate of the intake air.

4. A control apparatus for a waste gate valve as defined in claim 3, wherein said electronic control unit comprises a memory, in which there are stored a first map for the basic amount of the control signal with respect to the operational condition of the engine and a second map for the desired value of the mass flow rate with respect to the operational condition of the engine, and a microprocessor programed so as to execute the following steps;

(a) obtaining the basic amount of the control signal by retrieving the first map on the basis of the opening of the throttle valve and the number of revolutions of the engine;

(b) obtaining the desired value of the mass flow rate of the intake air by retrieving the second map on the basis of the opening of the throttle valve and the number of revolutions of the engine;

(c) comparing an actual value of the mass flow rate of the intake air with the desired value retrieved at step (b);

(d) determining a correction amount to the basic amount of the control signal retrieved at step (a) in accordance with the comparison result at step (c); and (e) finally forming the control signal supplied to said actuator by adding the correction amount determined at step (d) to the basic amount retrieved at step (a).

5. A control apparatus for a waste gate valve as defined in claim 1, wherein the signal depending on the mass flow rate is a load data defined as the ratio of the mass flow rate to the number of revolutions of the engine.

6. A control apparatus for a waste gate valve as defined in claim 5, wherein said electronic control unit comprises a memory, in which there are stored a first map for the basic amount of the control signal with respect to the operational condition of the engine and a second map for the desired value of the load data with respect to the operational condition of the engine, and a microprocessor programed so as to execute the following steps;

(a) obtaining the basic amount of the control signal by retrieving the first map on the basis of the opening of the throttle valve and the number of revolutions of the engine;

(b) obtaining the desired value of the load data by retrieving the second map on the basis of the opening of the throttle valve and the number of revolutions of the engine;

(c) comparing an actual value of the load data with the desired value retrieved at step (b);

(d) determining a correction amount to the basic amount of the control signal retrieved at step (a) in accordance with the comparison result at step (c); and (e) finally forming the control signal supplied to said actuator by adding the correction amount determined at step (d) to the basic amount retrieved at step (a).

* * * * *